(12) United States Patent
Tsujimoto

(10) Patent No.: US 7,575,407 B2
(45) Date of Patent: Aug. 18, 2009

(54) ARTICLE STORAGE FACILITY

(75) Inventor: Kazushi Tsujimoto, Gamo-gun (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 11/478,436

(22) Filed: Jun. 29, 2006

(65) Prior Publication Data

US 2007/0032903 A1 Feb. 8, 2007

(30) Foreign Application Priority Data

Jul. 5, 2005 (JP) .............................. 2005-196344

(51) Int. Cl.
*B65G 1/00* (2006.01)
(52) U.S. Cl. ..................................... 414/279
(58) Field of Classification Search ................ 414/273, 414/281, 279, 277, 940
See application file for complete search history.

(56) References Cited

U.S. PATENT DOCUMENTS

| 5,333,983 | A * | 8/1994 | Hatouchi et al. | ....... 414/331.06 |
| 6,467,582 | B1 * | 10/2002 | Nakashima et al. | ......... 187/244 |
| 6,845,834 | B2 * | 1/2005 | Hatanaka | ..................... 180/167 |
| 7,281,608 | B2 * | 10/2007 | Hansl et al. | .................. 187/226 |
| 2001/0038784 | A1 * | 11/2001 | Peltomaki | .................... 414/273 |
| 2002/0017433 | A1 * | 2/2002 | Nakashima et al. | ......... 187/249 |
| 2002/0021954 | A1 * | 2/2002 | Winkler | ....................... 414/273 |
| 2003/0082032 | A1 * | 5/2003 | McGowan | ................... 414/273 |
| 2004/0146380 | A1 * | 7/2004 | Baker et al. | .................. 414/273 |
| 2004/0165974 | A1 * | 8/2004 | Gironi et al. | ................. 414/281 |
| 2005/0053450 | A1 * | 3/2005 | Kantola et al. | .............. 414/273 |

FOREIGN PATENT DOCUMENTS

JP 2002-175117 6/2002

* cited by examiner

*Primary Examiner*—Saúl J Rodríguez
*Assistant Examiner*—Joshua I Rudawitz
(74) *Attorney, Agent, or Firm*—The Webb Law Firm

(57) ABSTRACT

An article storage facility comprising:

an article storage rack having a plurality of storage units arranged in horizontal rows and vertical columns;

a track extending in the vicinity of the article storage rack;

a plurality of article-conveying movable bodies capable of moving horizontally on the track in order to convey an article between the article storage rack and a loading/unloading article support unit;

an article transfer device provided to each of the movable bodies that is capable of vertical movement and that transfers the article between a movable body and a storage unit or the article support unit; and a control device for controlling the movements of the movable bodies; wherein the dimensions of the movable bodies are determined so as to enable two of the movable bodies adjacent each other in the horizontal direction to be positioned such that the two article transfer devices, provided to the two adjacent movable bodies, overlap in the vertical direction.

12 Claims, 9 Drawing Sheets

ARTICLE STORAGE FACILITY

BACKGROUND OF THE INVENTION

The present invention relates to an article storage facility comprising an article storage rack having a plurality of storage units, a movable body for conveying an article, and control means for controlling the actuation of the movable body.

In an article storage facility such as the one described above, an article-conveying movable body conveys an article between an article storage rack and a loading/unloading article support unit. Warehousing is thereby performed in which an article present in the loading/unloading article support unit is stored by a storage unit of the article storage rack, or retrieval is performed in which an article stored in the storage unit of the article storage rack is retrieved to the loading/unloading article support unit.

In a conventional example of this type of article storage facility, two article-conveying movable bodies are provided so as to move horizontally on the same track, and two loading/unloading article support units are provided so as to be disposed at both side branches of the article storage rack (see Japanese Laid-open Patent Application No. 2002-175117, for example).

In Japanese Laid-open Patent Application No. 2002-175117, one of the two movable bodies conveys an article between the article storage rack and one of the loading/unloading article support units, the other movable body conveys an article between the article storage rack and the other loading/unloading article support unit, and the two movable bodies simultaneously perform article conveyance, whereby the ability to convey articles is enhanced.

In the abovementioned Japanese Laid-open Patent Application No. 2002-175117, a configuration is adopted whereby the storage unit that is the transfer target of one movable body and the storage unit that is the transfer target of the other movable body are in different positions in the horizontal direction of the rack when the transfer targets of the two movable bodies are storage units of the article storage rack.

Consequently, when a plurality of articles is transferred to a plurality of storage units that are in the same position in the horizontal direction of the rack and in different positions in the vertical direction of the rack, two movable bodies transfer an article one at a time, which can lead to a corresponding decrease in the ability to convey articles.

SUMMARY OF THE INVENTION

The present invention was developed in view of the issues described above, and an object thereof is to provide an article storage facility whereby the ability to convey articles can be enhanced.

In order to achieve these objects, the article storage facility of the present invention comprises:

an article storage rack having a plurality of storage units arranged in horizontal rows and vertical columns;

a track extending in the vicinity of the article storage rack;

a plurality of article-conveying movable bodies capable of moving horizontally on the track in order to convey an article between the article storage rack and a loading/unloading article support unit;

article transfer means provided to each of the movable bodies that is capable of vertical movement and that transfers the article between a movable body and a storage unit or the article support unit; and control means for controlling the movements of the movable bodies; wherein the dimensions of said movable bodies are determined so as to enable two of said movable bodies adjacent each other in the horizontal direction to be positioned such that the two article transfer means, provided to the two adjacent movable bodies, overlap in the vertical direction.

Therefore, the operation for conveying an article with one of two movable bodies that are adjacent to each other in the direction of horizontal movement can be performed simultaneously with the operation for conveying an article with the other movable body, and an article can therefore be conveyed efficiently using a plurality of movable bodies. It is thereby possible to provide an article storage facility having an enhanced article conveyance capacity.

DETAILED DESCRIPTION OF PREFERRED EMBODIMENTS

Embodiments of the article storage facility according to the present invention will be described based on the drawings.

Figure 1:
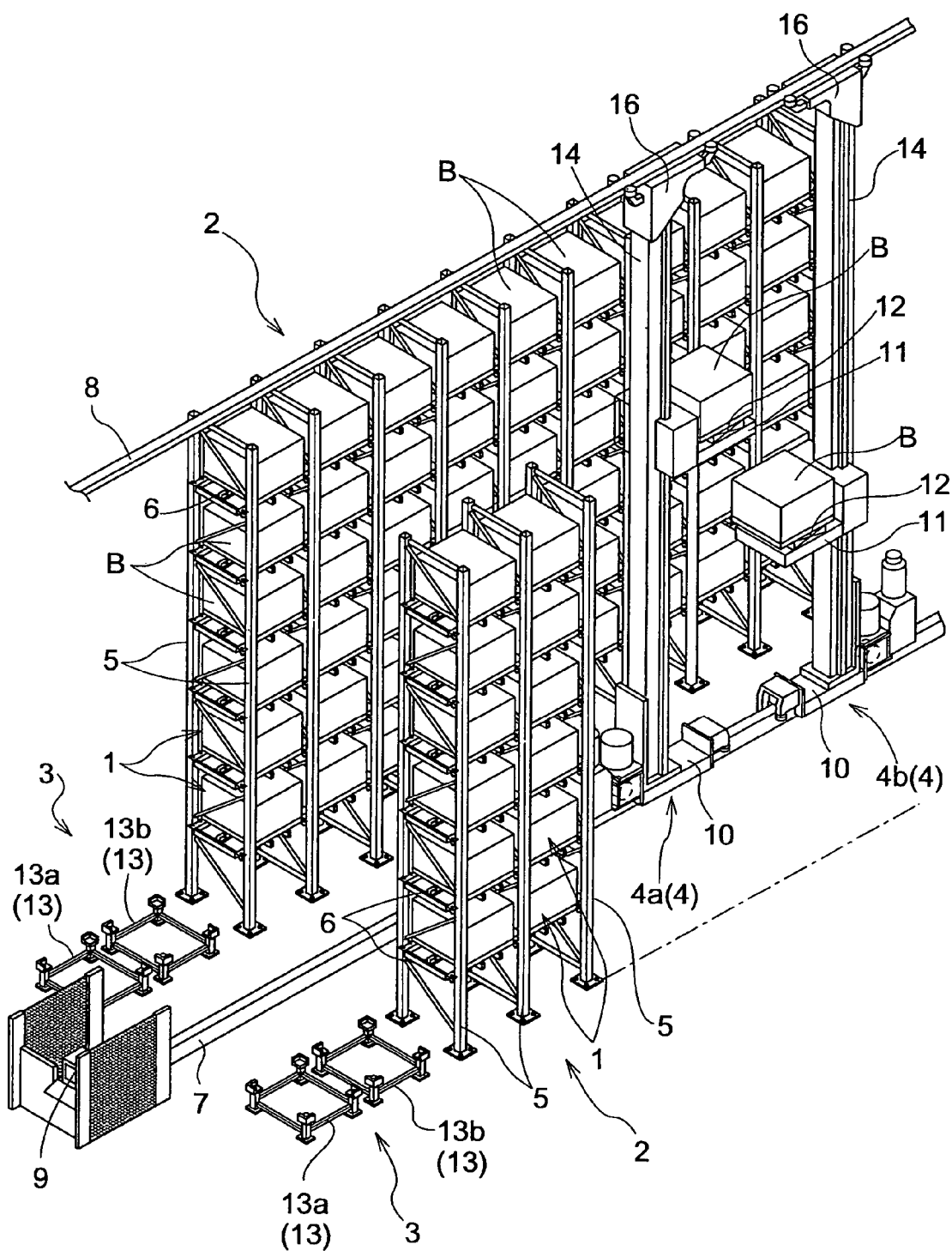
FIG. 1 is a perspective view of an article storage facility.

As shown in FIG. 1, this article storage facility is composed of an article storage rack 2 provided with a plurality of storage units 1 arranged vertically and horizontally, and a stacker crane 4 as a movable body for conveying an article B between the article storage rack 2 and a loading/unloading article support unit 3.

In the article storage rack 2, front and back pillars 5 are vertically arranged in a plurality of pairs at an interval in the horizontal direction, and a plurality of placement support units 6 extending in the horizontal direction is provided at an interval in the vertical direction to each pair of front and back pillars 5.

One pair of front and back pillars 5 and one pair of left and right placement support units 6 form a single storage unit 1, and a plurality of storage units 1 is provided vertically and horizontally.

Two article storage racks 2 are provided at an interval so as to face each other in the direction in which articles move in and out, and two loading/unloading article support units 3 are mounted at an interval so as to face each other at the sides of the article storage racks 2 and in other adjacent positions in the horizontal direction of the article storage rack 2.

Each of the plurality of storage units 1 and each of the loading/unloading article support units 3 in the article storage rack 2 is configured as an article transfer location.

A travel rail 7 is mounted on the floor surface between the two article storage racks 2 as a track that extends through the entire range of the horizontal direction of the article storage racks 2 to the loading/unloading article support units 3, and a guide rail 8 that extends through the entire range of the horizontal direction of the article storage racks 2 to the loading/unloading article support units 3 is mounted to the top side. A stacker crane 4 is provided so as to move horizontally on the travel rail 7 while being guided by the guide rail 8.

A ground controller 9 for managing the operation of the stacker crane 4 is provided to the end on the side of the loading/unloading article support units 3 among the ends of the travel rail 7, and the ground controller 9 manages storage information such as which article is stored in which storage unit 1.

Figure 2:
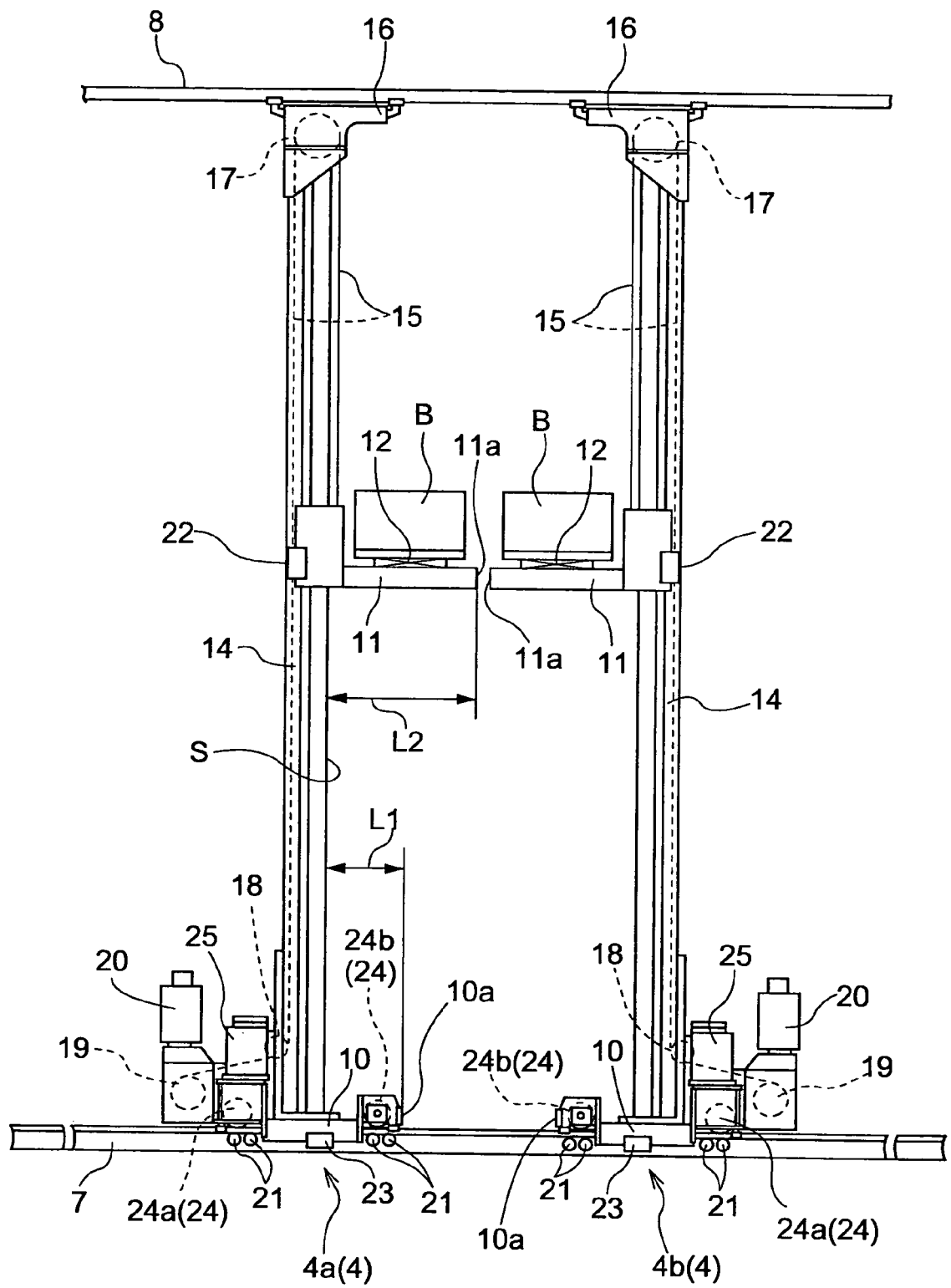
FIG. 2 is a side view of a stacker crane.

Two stacker cranes 4 are provided so as to move horizontally on the same travel rail 7. As shown in FIG. 2, each of the two stacker cranes 4 is composed of a horizontally movable traveling truck 10 that travels along the travel rail 7, a lift platform 11 capable of lifting and lowering with respect to the traveling truck 10, and a transfer device 12 (a fork-type transfer device, for example) as an article transfer means provided to the lift platform 11.

As a transfer device 12, any of the various known devices, other than the fork type transfer device that has two pairs of arms are telescopically extended by a motor driven chain, may be employed. Another example of a transfer device is disclosed in US Patent Application Publication 2005/0036858A1, which is incorporated herein by reference.

The stacker cranes 4 are configured so as to store an article B present in the loading/unloading article support unit 3 in a storage unit 1 of the article storage rack 2, or to retrieve the article B stored in the storage unit 1 of the article storage rack 2 to the loading/unloading article support unit 3 by horizontal movement of the traveling trucks 10, vertical movement of the lift platforms 11, and transfer of the transfer devices 12.

As shown in FIG. 1, two receiving platforms 13 as loading/unloading article support units 3 onto which the article B is placed are arranged in the direction of horizontal movement of the stacker crane 4. The loading/unloading article support units 3 used for storage and retrieval are thus configured so that two stacker cranes 4 can be positioned along the direction of horizontal movement, and an article B can be transferred to and from a receiving platform 13 by the transfer devices 12 provided to each stacker crane 4.

In this embodiment, the stacker crane positioned on the side of the loading/unloading article support units 3 among the two stacker cranes 4 is designated as the first stacker crane 4a, and the stacker crane positioned on the side of the article storage rack 2 is designated as the second stacker crane 4b.

Among the two receiving platforms 13, the receiving platform positioned on the far side of the article storage racks 2 is designated as the first receiving platform 13a, and the receiving platform positioned on the near side of the article storage racks 2 is designated as the second receiving platform 13b.

The first stacker crane 4a conveys an article between the first receiving platform 13a and the article storage racks 2, and the second stacker crane 4b conveys an article between the second receiving platform 13b and the article storage racks 2.

A single vertical post 14 for guiding and supporting the lift platform 11 so as to allow the lift platform 11 to move up and down is vertically provided to the traveling truck 10, and the position in which this vertical post 14 is erected is substantially separated from the end portion 10a closer to the remaining single stacker crane 4 in the direction of horizontal movement of the stacker cranes 4. The position in which the vertical post 14 is erected may be on the opposite side from the side on which the remaining single stacker crane 4 is positioned in the direction of horizontal movement of the stacker cranes 4.

As shown in FIG. 2, the lift platforms 11 of the traveling trucks 10 each have an opposing face 11a closest to the adjacent traveling truck 10 in the direction of horizontal movement. The length L1 by which the end portion 10a closest to the adjacent traveling truck 10 protrudes from the reference surface S of the vertical post in the horizontal direction in each traveling truck 10 is smaller than the length L2 by which the opposing face 11a protrudes from the reference surface S in the horizontal direction. The length L1 is preferably 70% or less of the length L2.

The lift platform 11 is suspended and supported by a lift chain 15. The lift chain 15 is suspended between a guide sprocket 17 provided to an upper frame 16 guided along the guide rail 8 and a guide sprocket 18 provided to the lower side of the vertical post 14, and is connected to a takeup drum 19 fitted to one end of the traveling truck 10.

The takeup drum 19 is rotatably driven forward and backward by an inverter-type electric lift motor 20, and the lift platform 11 is raised and lowered by the outward and inward spooling of the lift chain 15.

The lift platform 11 is provided with a lift rotary encoder 22 for detecting the vertical position of the lift platform 11 in the lift path.

This lift rotary encoder 22 is not shown in detail in the drawing, but a sprocket for meshing with a chain laid in the vertical direction of the vertical post 14 is attached to the rotating shaft of the lift rotary encoder 22, the sprocket is rotated by the lifting of the lift platform 11, and the vertical position of the lift platform 11 is detected by detecting the lift distance of the lift platform 11 from a reference position set at the lower end portion of the lift path.

Two wheels 24 (front and back) that can travel on the travel rail 7 are provided to the traveling truck 10. The wheel on one end in the direction of horizontal movement among the two wheels 24 is configured as a drive wheel 24a driven by an inverter-type electric travel motor 25, and the wheel on the other end in the direction of horizontal movement is configured as a free-rotating driven wheel 24b.

The inverter-type electric travel motor 25 rotatably drives the drive wheel 24a forward and backward, whereby the traveling truck 10 is moved horizontally.

A guide roller 21 capable of rotating about a horizontal axis is provided to the traveling truck 10 in each position in which the two wheels 24 (front and back) are disposed. The roller contacts the travel rail 7 so as to restrict upward movement, and for preventing the wheels 24 from lifting off of the travel rail 7.

A travel rotary encoder 23 for detecting the travel position of the traveling truck 10 in the travel path is provided to the traveling truck 10.

This travel rotary encoder 23 is not shown in detail in the drawing, but a sprocket for meshing with a chain laid along the travel rail 7 is attached to the rotating shaft of the travel rotary encoder 23, the sprocket is rotated by the horizontal movement of the traveling truck 10, and the travel position of the traveling truck 10 is detected by detecting the distance which the traveling truck 10 has moved horizontally from a reference position set at one end of the travel rail 7.

Figure 3:
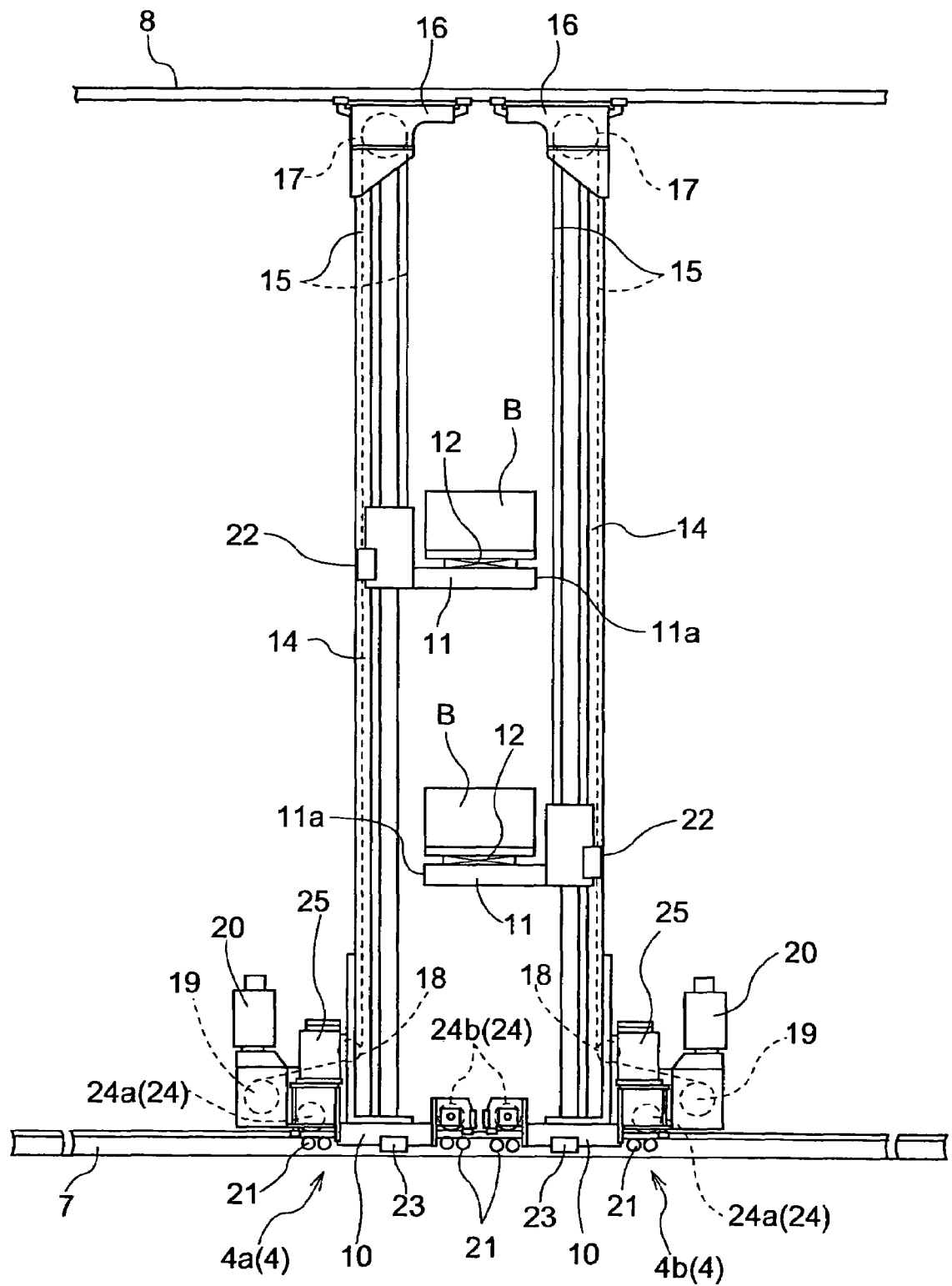
FIG. 3 is a side view of a stacker crane.

As shown in FIG. 3, the two stacker cranes 4 are configured so that the provided transfer devices 12 can be positioned in an overlapped state in the vertical direction. Each of the two stacker cranes 4 is also capable of positioning the provided transfer devices 12 in an overlapped state in the vertical direction by moving closer to the other stacker crane 4 adjacent in the direction of horizontal movement. It is preferable to have a control means that control the stacker cranes 4 and the transfer devices to have the overlap state (or overlap mode) only when there is a greater load on the storage facility e.g. when the number of articles to be carried in or out of the facility exceeds a predetermined number or when there is a predetermined number of articles that need to be processed urgently, so that when the load on the facility is light, the overlap mode is not used. Only one stacker crane 4 may be used when there is relatively small number of articles to be processed.

Positioning the transfer devices 12 provided thereto in an overlapped state in the vertical direction in this manner allows the two stacker cranes 4 to transfer articles B simultaneously with respect to two storage units 1 having the same position in the horizontal direction of the rack and different positions in the vertical direction of the rack among the plurality of storage units 1 in the article storage rack 2.

When the two stacker cranes 4 are in proximity to each other so as to be adjacent to each other, the position of the vertical post 14 in the horizontal direction in the traveling truck 10 is adjusted so that the traveling trucks 10 do not come in contact with each other, while the transfer devices 12 overlap each other in the vertical direction. The width of the upper frame 16 in the horizontal direction is also adjusted when the two stacker cranes 4 are in proximity to each other so that the upper frames 16 do not come in contact with each other, while the transfer devices 12 overlap each other in the horizontal direction.

Figure 4:
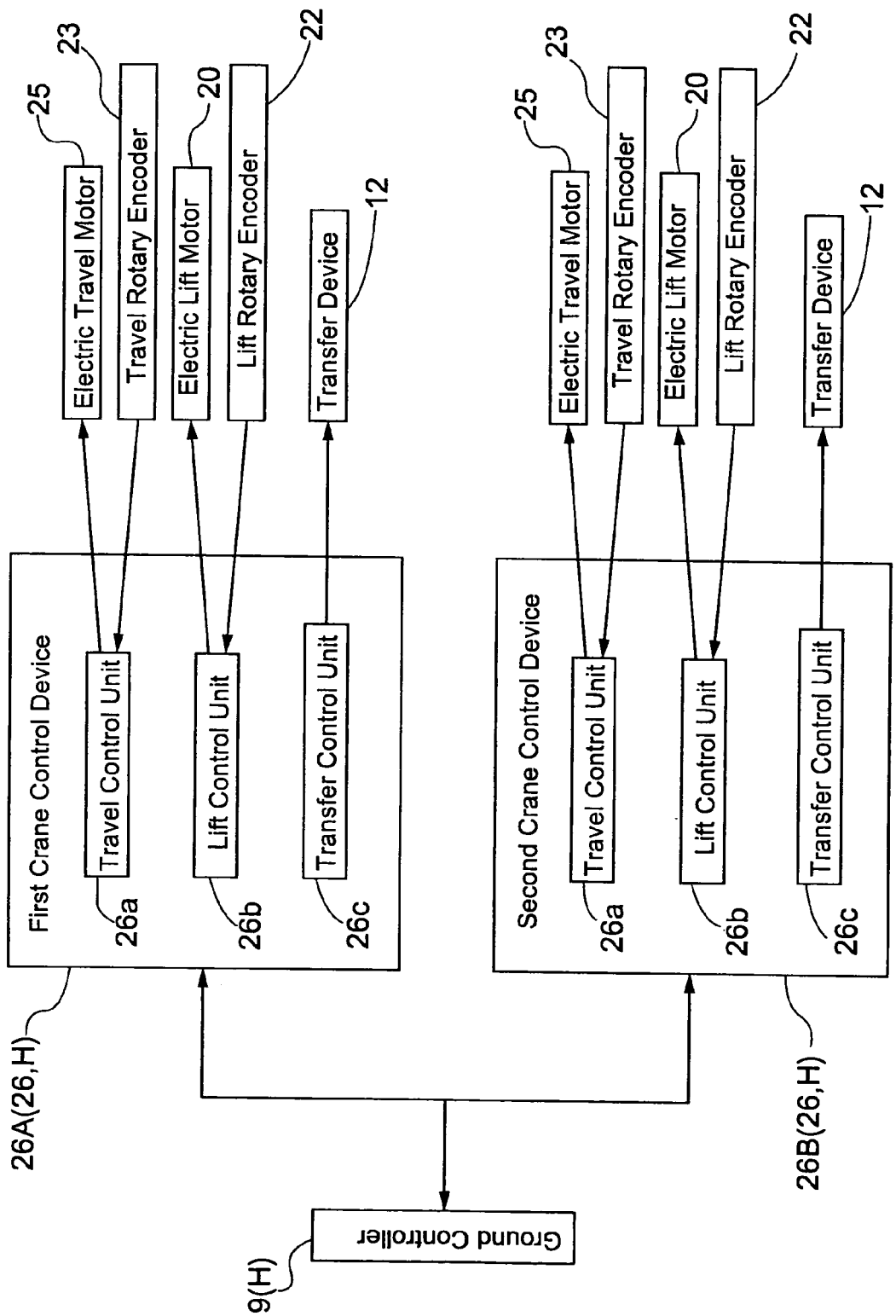
FIG. 4 is a block diagram showing the article storage facility.

As shown in FIG. 4, a crane control device 26 for controlling the operation of the stacker crane 4 is provided to each of the two stacker cranes 4. In FIG. 4, the crane control device 26 provided to the first stacker crane 4a is designated as the first crane control device 26A, and the crane control device 26 provided to the second stacker crane 4b is designated as the second crane control device 26B.

The detection information of the lift rotary encoders 22 and the detection information of the travel rotary encoders 23 are inputted to the crane control devices 26.

The first crane control device 26A and the second crane control device 26B have the same structure.

The crane control devices 26 are configured so that the horizontal movement of the traveling trucks 10 and the vertical movement of the lift platforms 11 are controlled so as to move the transfer devices 12 to rack-side article transfer positions at each of the plurality of storage units 1, and to convey articles with controlled transfer of the transfer devices 12 so that the transfer devices 12 transfer articles to and from the storage units 1 and the loading/unloading article support units 3 in the rack-side article transfer positions and the loading/unloading-side article transfer position.

Specifically, the rack-side article transfer position and the loading/unloading-side article transfer position are positions measured from a lift target stopping position and a travel target stopping position. A loading/unloading-side article transfer position is determined for each of the two receiving platforms 13, and a lift target stopping position and a travel target stopping position are set for each of the two receiving platforms 13. An rack-side article transfer position is determined for each of the plurality of storage units 1, and a lift target stopping position and a travel target stopping position are set for each of the plurality of storage units 1.

The crane control devices 26 are composed of a travel control unit 26a for controlling the horizontal movement of the traveling truck 10 so as to cause the traveling truck 10 to travel to a prescribed travel target stopping position based on the detection information of the travel rotary encoder 23, a lift control unit 26b for controlling the lift actuation of the lift platform 11 so as to cause the lift platform 11 to rise to a prescribed lift target stopping position based on the detection information of the lift rotary encoder 22, and a transfer control unit 26c for controlling the transfer of the transfer device 12 so that articles are transferred to and from the storage units 1 and the receiving platforms 13.

In the travel control performed in the travel control unit 26a, the electric travel motor 25 is started to initiate horizontal movement of the traveling truck 10, and when the travel position of the traveling truck 10 detected by the travel rotary encoder 23 reaches the prescribed travel target stopping position, the electric travel motor 25 is stopped, a brake is applied, and operation of the electric travel motor 25 is controlled so that the traveling truck 10 is stopped in the travel target stopping position.

In the lift control procedure of the lift control unit 26b, the electric lift motor 20 is started to initiate vertical movement of the lift platform 11, and when the vertical position of the lift platform 11 detected by the lift rotary encoder 22 reaches the prescribed lift target stopping position, the electric lift motor 20 is stopped, a brake is applied, and operation of the electric lift motor 20 is controlled so that the lift platform 11 is stopped in the lift target stopping position.

In the transfer control procedure of the transfer control unit 26c, the fork-type transfer device 12 is started, and transfer of the transfer device 12 is controlled so that the fork is extended, the article B is loaded or unloaded, and the fork is then retracted.

Various types of information can be transmitted between the crane control device 26 and the ground controller 9, and the ground controller 9 issues various types of instructions to the two crane control devices 26, which include the first crane control device 26A and the second crane control device 26B.

The crane control devices 26 are configured so that travel control is performed by the travel control unit 26a, lift control is performed by the lift control unit 26b, and transfer control is performed by the transfer control unit 26c on the basis of instructions from the ground controller 9, whereby articles are conveyed.

A control means H for controlling the operation of the plurality of stacker cranes 4 is thus composed of the ground controller 9 and two crane control devices 26.

The control means H is configured so as to select both of the two stacker cranes 4 or one of the two stacker cranes 4 as an article-conveying stacker crane 4, and to perform an article conveyance operation based on article conveyance command information.

When the control means H selects one of the two stacker cranes 4 as the article-conveying stacker crane 4, the control means H performs a selection operation for selecting the article-conveying stacker crane 4 among the two stacker cranes 4, and performs an article conveyance operation for causing the stacker crane 4 selected in the selection operation to convey the article.

In the selection operation, the stacker crane 4 that will convey the article is selected on the basis of whether the stacker crane 4 is currently conveying an article, what the current positions of the two stacker cranes 4 are, and other selection conditions. For example, when both of the two stacker cranes 4 are in the loading/unloading-side article transfer position, the second stacker crane 4b is selected as the stacker crane 4 that will convey the article.

The control means H thus selectively executes a simultaneous storage operation, a first independent storage operation, a second independent storage operation, a simultaneous retrieval operation, a first independent retrieval operation, or a second independent retrieval operation based on article conveyance command information and selection conditions.

The simultaneous storage operation and the simultaneous retrieval operation are article conveyance operations in which both of the two stacker cranes 4 are selected as stacker cranes that will convey an article.

The first independent storage operation and the first independent retrieval operation are article conveyance operations in which the first stacker crane 4a among the two stacker cranes 4 is selected as the stacker crane that will convey an article.

The second independent storage operation and the second independent retrieval operation are article conveyance operations in which the second stacker crane 4b among the two stacker cranes 4 is selected as the stacker crane that will convey an article.

Figure 5:
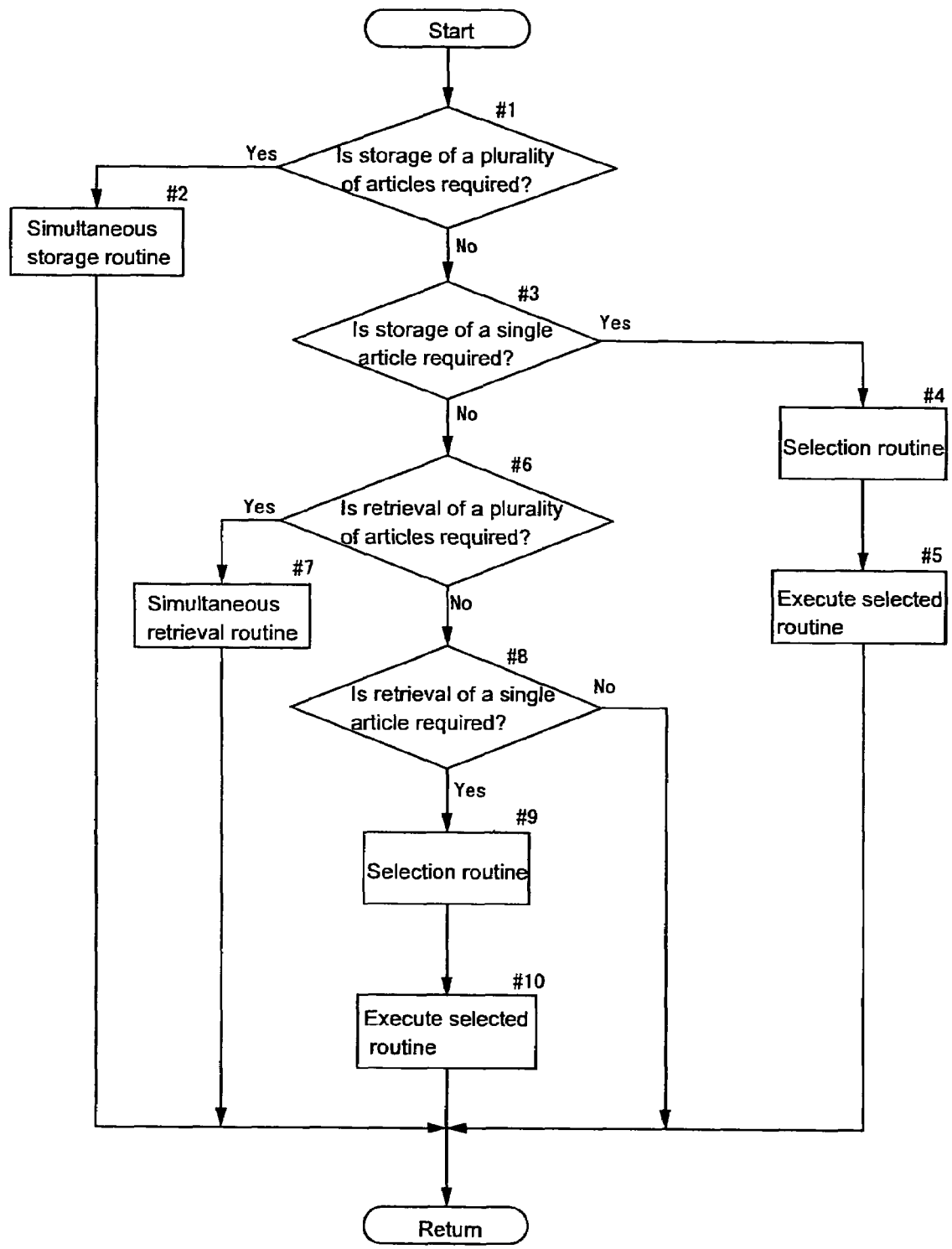
FIG. 5 is a flowchart showing the control operation of the operating control means.

The flowchart in FIG. 5 will be used to describe which operation the control means H executes among the plurality of operations based on the article conveyance command information and the selection conditions.

The control means H selects and executes the simultaneous storage operation when the article conveyance command information requires storage of a plurality of articles B (steps 1 and 2).

The control means H performs the operation for selecting either the first independent storage operation or the second independent storage operation based on the selection conditions when the article conveyance command information requires storage of a single article B, and executes the operation selected in the selection operation (steps 3 through 5).

The control means H selects and executes the simultaneous retrieval operation when the article conveyance command information requires retrieval of a plurality of articles B (steps 6 and 7).

The control means H performs the selection operation for selecting either the first independent retrieval operation or the second independent retrieval operation based on the selection conditions when the article conveyance command information requires retrieval of a single article B, and executes the sequence selected in the selection operation (steps 8 through 10).

The operation of the two stacker cranes 4 in the simultaneous storage operation, the first independent storage operation, the second independent storage operation, the simultaneous retrieval operation, the first independent retrieval operation, and the second independent retrieval operation will be described hereinafter based on FIGS. 6 through 9.

FIGS. 6 through 9 are side views in which a portion of the article storage facility is omitted, wherein the loading/unloading article support unit 3 is positioned at the left end, and the article storage rack 2 is positioned to the right of the loading/unloading article support unit 3.

The operation performed in the simultaneous storage operation will first be described based on FIGS. 6 and 7. In this simultaneous storage operation, both of the two stacker cranes 4 that include the first stacker crane 4a and the second stacker crane 4b convey and store articles.

The ground controller 9 issues a storage instruction to both the first crane control device 26A in the first stacker crane 4a and the second crane control device 26B in the second stacker crane 4b.

The storage instruction issued to the first crane control device 26A is an instruction for causing an article B placed on the first receiving platform 13a to be stored in a storage unit 1, and indicates the lift target stopping position and travel target stopping position for the loading/unloading-side article transfer position at the first receiving platform 13a, and the rack-side article transfer position at the storage unit 1 in which the article B is to be stored.

The storage instruction issued to the second crane control device 26B is an instruction for causing an article B placed on the second receiving platform 13b to be stored in a storage unit 1, and indicates the lift target stopping position and travel target stopping position for the loading/unloading-side article transfer position at the second receiving platform 13b, and the rack-side article transfer position at the storage unit 1 in which the article B is to be stored.

Figure 6:
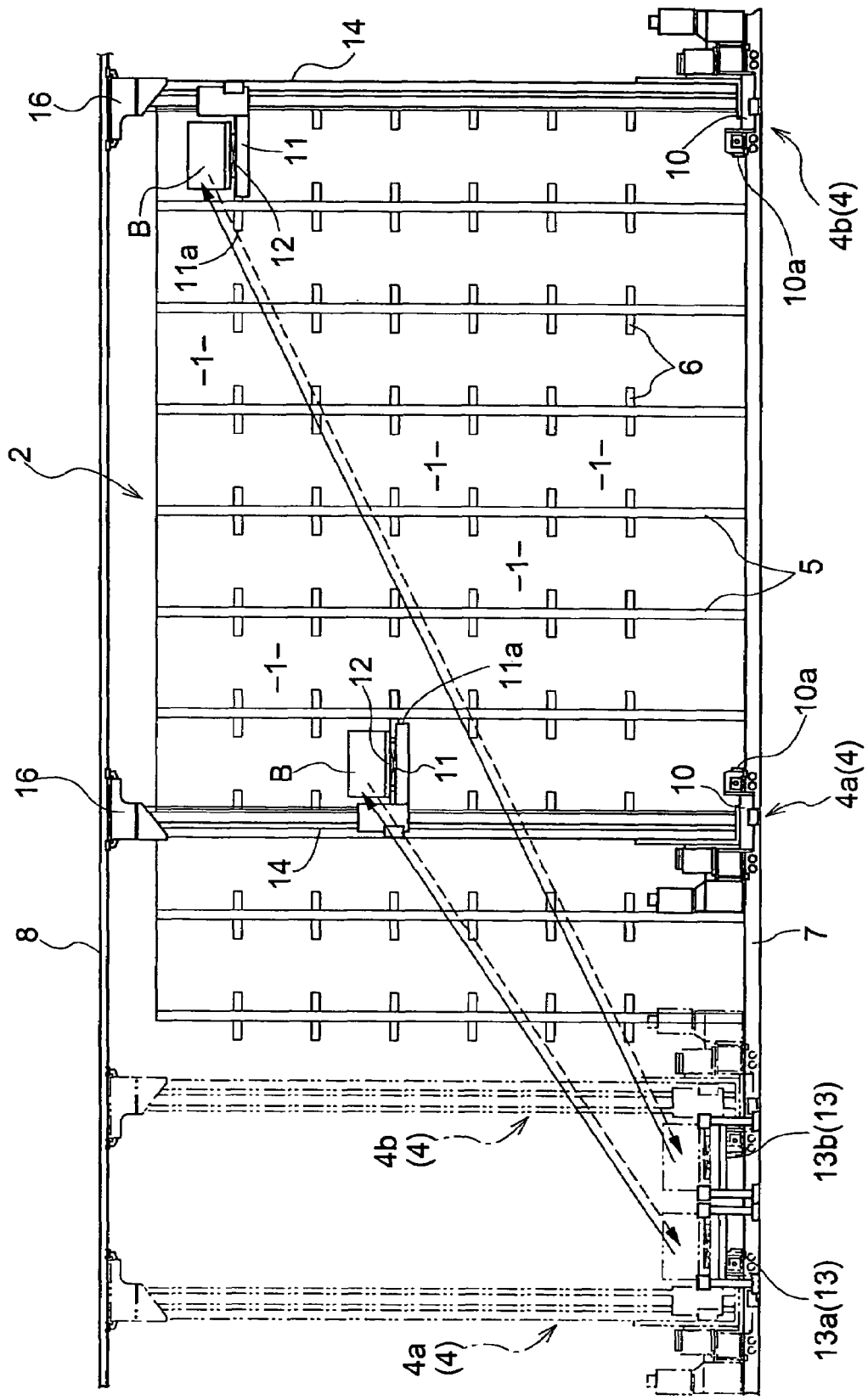
FIG. 6 is a diagram showing the operation of the stacker crane in the simultaneous storage operation and the simultaneous retrieval operation.

Concerning the storage units 1 in which the articles B are to be stored, a plurality of storage units 1 having different positions in the horizontal direction of the rack is sometimes designated as the storage units 1 that are the transfer targets in which the articles B are to be stored, as shown in FIG. 6. A plurality of storage units 1 having the same position in the horizontal direction of the rack and different positions in the vertical direction of the rack is also sometimes designated as the storage units 1 that are the transfer targets in which the articles B are to be stored, as shown in FIG. 7.

Described below with reference to FIG. 6 is a case in which a plurality of storage units 1 having different positions in the horizontal direction of the rack is designated as the transfer target storage units 1.

Instructions issued by the ground controller 9 are such that the storage instruction for the first crane control device 26A ensures that the storage unit 1 designated to store the article B is closer to the loading/unloading article support unit 3 in the horizontal direction of the rack than the storage unit designated by the storage instruction for the second crane control device 26B.

When the storage instruction is received by the first crane control device 26A, the first stacker crane 4a first receives the article B placed on the first receiving platform 13a as indicated by the solid-line arrow in FIG. 6, and travel control by the travel control unit 26a, lift control by the lift control unit 26b, and transfer control by the transfer control unit 26c are then performed so that the first stacker crane 4a stores the received article B in the appropriate storage unit 1.

When the storage instruction is received by the second crane control device 26B, the second stacker crane 4b first receives the article B placed on the second receiving platform 13b as indicated by the solid-line arrow in FIG. 6, and travel control by the travel control unit 26a, lift control by the lift control unit 26b, and transfer control by the transfer control unit 26c are then performed so that the second stacker crane 4b stores the received article B in the appropriate storage unit 1.

Figure 7:
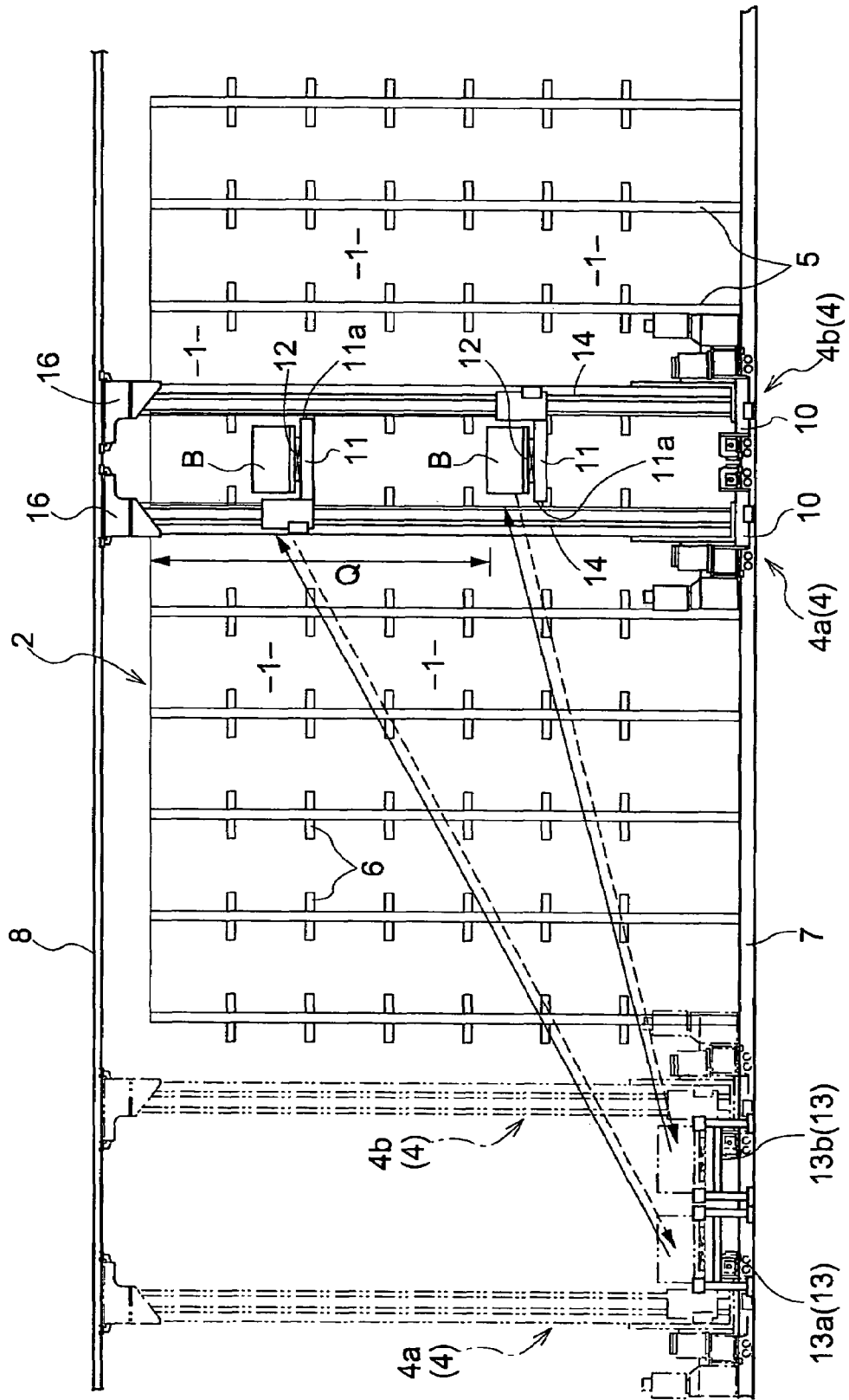
FIG. 7 is a diagram showing the operation of the stacker crane in the simultaneous storage operation and the simultaneous retrieval operation.

Described below with reference to FIG. 7 is a case in which a plurality of storage units 1 having the same position in the horizontal direction of the rack and different positions in the vertical direction of the rack is designated as the transfer target storage units 1.

The control means H executes a simultaneous transfer operation for controlling the horizontal movement of two stacker cranes 4, the rising and lowering of two transfer devices 12, and the transfer of two transfer devices 12 in order to position the transfer devices 12 provided to two stacker cranes 4 in the rack-side article transfer positions that correspond to the transfer target storage units 1 in an overlapped state in the vertical direction, and use the transfer devices 12 to transfer an article B between the transfer target storage units 1 when the article is transferred between a plurality of transfer target storage units 1.

The control means H is also configured so that in the simultaneous transfer operation, the transfer device 12 provided to one of the stacker cranes 4 among the two stacker cranes 4 adjacent to each other in the direction of horizontal movement is positioned in the rack-side article transfer position, the stacker crane 4 is moved horizontally, and the transfer device 12 is raised or lowered. The other stacker crane 4 is also moved horizontally so that its transfer device 12 remain within a non-interference range Q in which there is no interference in the vertical direction with the transfer device 12 provided to the other stacker crane 4, this stacker crane 4 is moved horizontally, and the transfer device 12 is raised or lowered.

Furthermore, the ground controller 9 issues a storage instruction for simultaneous transfer to the second crane control device 26B so that the transfer target storage unit 1 has the same position in the horizontal direction of the rack and a different position in the vertical direction of the rack, and issues a storage instruction for simultaneous transfer to the first crane control device 26A.

When the storage instruction for simultaneous transfer is received by the second crane control device 26B, the second stacker crane 4b first receives the article B placed on the second receiving platform 13b as indicated by the solid-line arrow in FIG. 7, and travel control by the travel control unit 26a, lift control by the lift control unit 26b, and transfer control by the transfer control unit 26c are then performed so that the second stacker crane 4b stores the received article B in the appropriate storage unit 1.

When the storage instruction for simultaneous transfer is received by the first crane control device 26A, travel control by the travel control unit 26a, lift control by the lift control unit 26b, and transfer control by the transfer control unit 26c are first performed so that the first stacker crane 4a receives the article B placed on the first receiving platform 13a.

The first stacker crane 4a then stores the received article B in the appropriate storage unit 1. Travel control by the travel control unit 26a and lift control by the lift control unit 26b are performed at this time in the first crane control device 26A so that the transfer device 12 of the second stacker crane 4b and the transfer device 12 of the first stacker crane 4a overlap each other in the vertical direction.

In the first crane control device 26A, travel control by the travel control unit 26a and lift control by the lift control unit 26b are performed so that the transfer device 12 of the first stacker crane 4a is caused to move closer to the rack-side article transfer position at the storage unit 1 in which the article B is to be stored, and the transfer device 12 of the first stacker crane 4a is positioned within the non-interference range Q in which there is no interference in the vertical direction with the transfer device 12 of the second stacker crane 4b when the transfer device 12 of the second stacker crane 4b and the transfer device 12 of the first stacker crane 4a are superposed on each other in the vertical direction.

Measures are thus taken to ensure that the transfer device 12 of the first stacker crane 4a and the transfer device of the second stacker crane 4b do not come in contact with each other. Any non-interference range Q can be adopted as long as there is no interference in the vertical direction with the transfer device 12 of the second stacker crane 4b. For example, a range may also be set that has a width equal to a set width in the vertical direction of the placement position from the placement position of the storage unit 1 in which the first stacker crane 4 stores the article B.

The first crane control device 26A then causes the transfer device 12 of the first stacker crane 4a to be positioned in the rack-side article transfer position at the storage unit 1 in which the article B is to be stored, whereupon transfer control by the transfer control unit 26c is performed so that the first stacker crane 4a stores the received article B in the appropriate storage unit 1.

The first independent storage operation will next be described based on FIG. 8. This first independent storage operation allows an article to be stored by being conveyed using the first stacker crane 4a among the two stacker cranes 4.

The ground controller 9 issues a storage instruction to the first crane control device 26A, and issues a standby instruction or an ejection instruction to the second crane control device 26B.

The standby instruction is an instruction for causing the second stacker crane 4b to stand by in position. The ejection instruction is an instruction for moving the second stacker crane 4b outside the range in which the first stacker crane 4a moves in order to convey an article, and indicates the travel target stopping position of a storage unit 1 outside this range.

Figure 8:
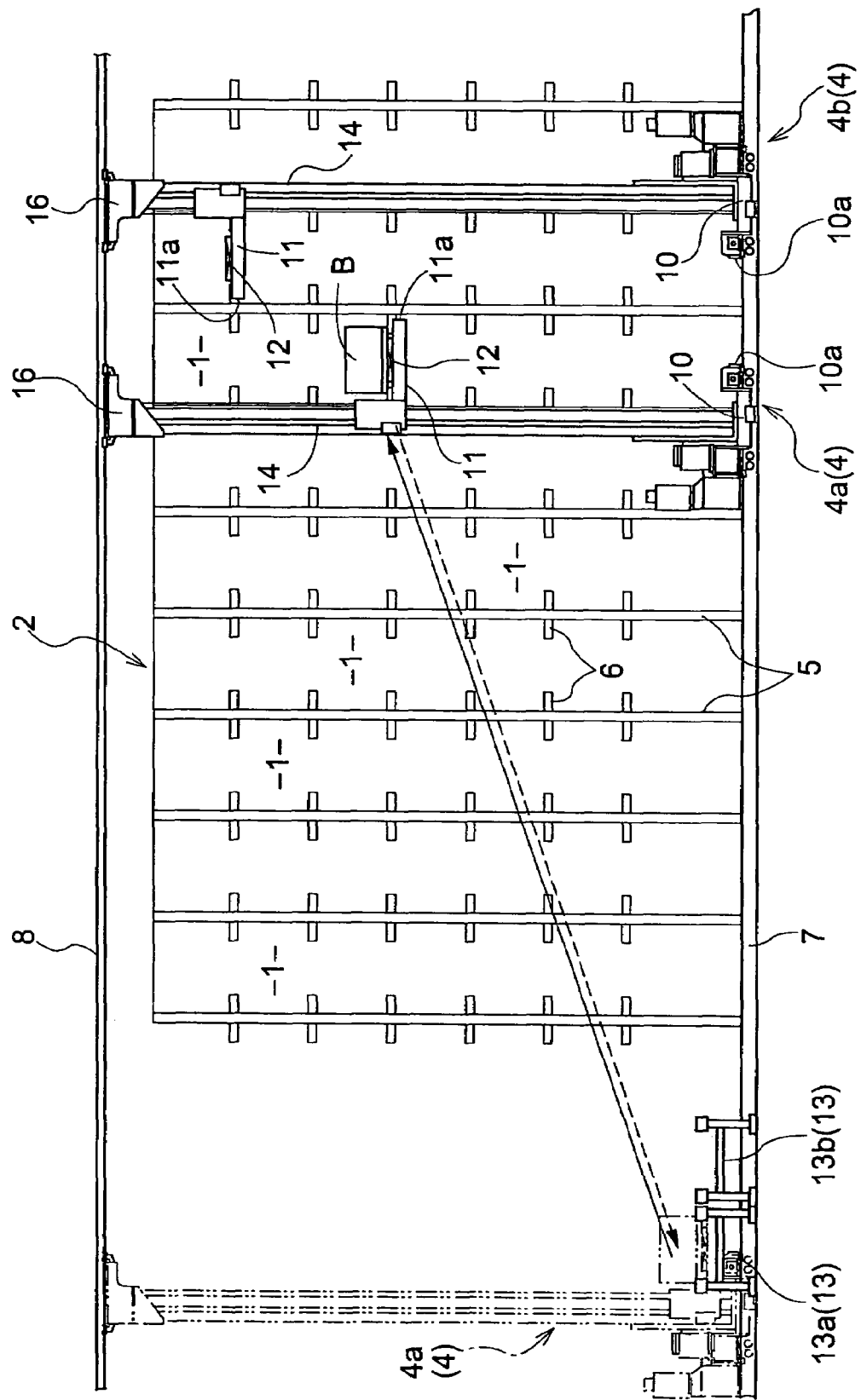
FIG. 8 is a diagram showing the operation of the stacker crane in the first independent storage operation and the first independent retrieval operation.

In the first crane control device 26A, travel control by the travel control unit 26a, lift control by the lift control unit 26b, and transfer control by the transfer control unit 26c are performed so that the first stacker crane 4a first receives the article B placed on the first receiving platform 13a, and then the first stacker crane 4a stores the received article B in the appropriate storage unit 1, as indicated by the solid-line arrow in FIG. 8.

When a standby instruction is received by the second crane control device 26B, the second stacker crane 4b is caused to stand by in position as indicated by the solid line in the drawing, without travel control by the travel control unit 26a, lift control by the lift control unit 26b, or transfer control by the transfer control unit 26c being performed.

When an ejection instruction is received by the second crane control device 26B, travel control by the travel control unit 26a is performed so that the traveling truck 10 is positioned in the prescribed travel target stopping position, as indicated by the solid line in the drawing.

The second independent storage operation will next be described based on FIG. 9. This second independent storage operation allows an article to be stored by being conveyed using the second stacker crane 4b among the two stacker cranes 4.

The ground controller 9 issues an ejection instruction for HP to the first crane control device 26A, and issues a storage instruction to the second crane control device 26B in the second stacker crane 4b.

In this ejection instruction for HP, the travel target stopping position is indicated for the loading/unloading-side article transfer position at the first receiving platform 13a.

In the first crane control device 26A, travel control by the travel control unit 26a is performed so that the traveling truck 10 is positioned in the travel target stopping position as the loading/unloading-side article transfer position at the first receiving platform 13a.

Figure 9:
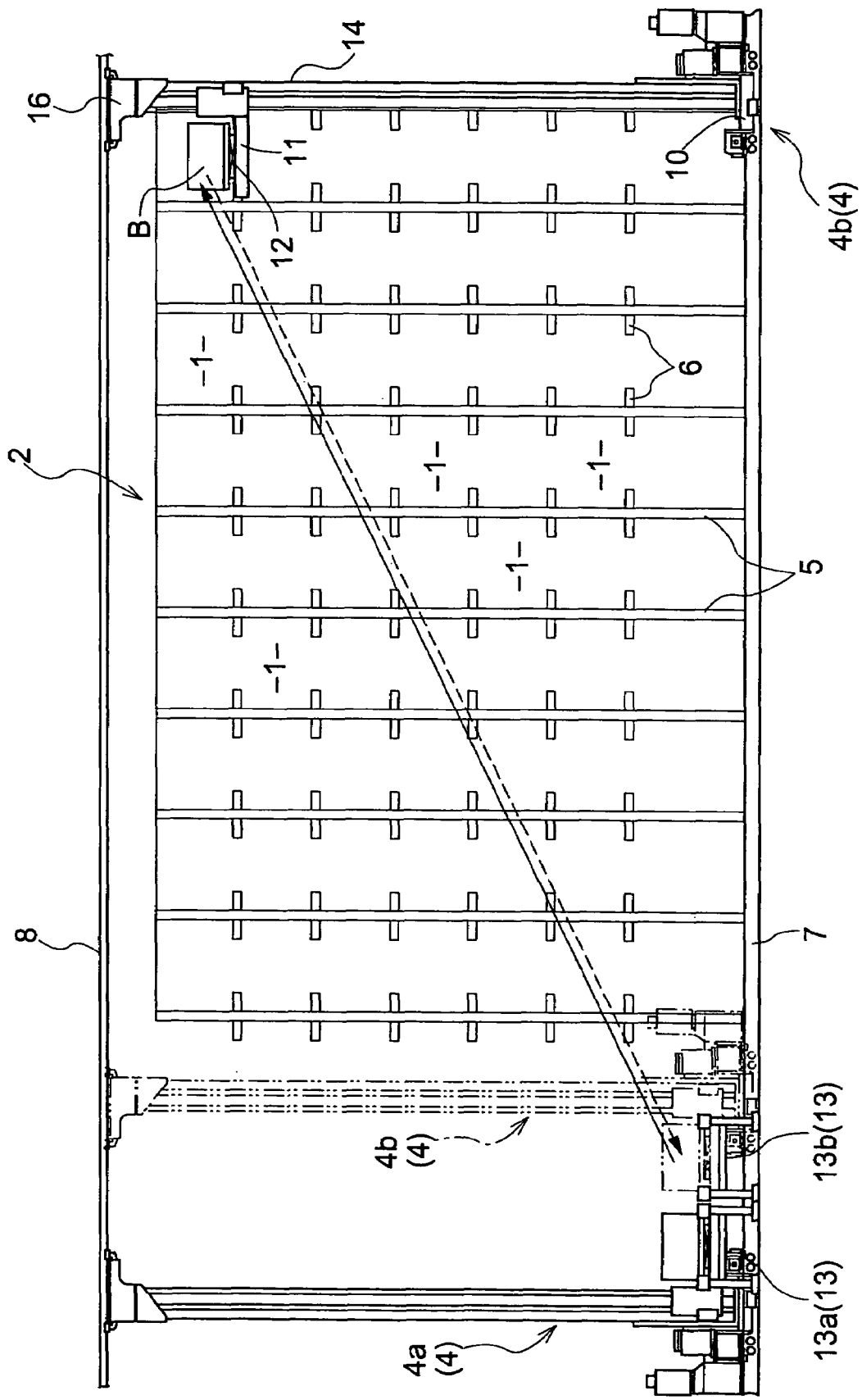
FIG. 9 is a diagram showing the operation of the stacker crane in the second independent storage operation and the second independent retrieval operation.

In the second crane control device 26B, travel control by the travel control unit 26a, lift control by the lift control unit 26b, and transfer control by the transfer control unit 26c are performed so that the second stacker crane 4b first receives the article B placed on the second receiving platform 13b, and then the second stacker crane 4b stores the received article B in the appropriate storage unit 1, as indicated by the solid-line arrow in FIG. 9.

The simultaneous retrieval operation will next be described based on the dashed-line arrows and the like in FIGS. 6 and 7. In the reverse of the simultaneous storage operation, the simultaneous retrieval operation retrieves an article by causing the article to be conveyed by the two stacker cranes 4 that include the first stacker crane 4a and the second stacker crane 4b.

The ground controller 9 issues a retrieval instruction to both the first crane control device 26A and the second crane control device 26B.

The retrieval instruction for the first crane control device 26A is an instruction for bringing the article B stored in the storage unit 1 to the first receiving platform 13a, and indicates the lift target stopping position and travel target stopping position as the rack-side article transfer position at the storage unit 1 from which the article B is to be retrieved, and the loading/unloading-side article transfer position at the first receiving platform 13a.

The retrieval instruction for the second crane control device 26B is an instruction for bringing the article B stored in the storage unit 1 to the second receiving platform 13b, and indicates the lift target stopping position and travel target stopping position as the rack-side article transfer position at the storage unit 1 from which the article B is to be retrieved, and as the loading/unloading-side article transfer position at the second receiving platform 13b.

Concerning the storage units 1 from which the articles B are to be retrieved, a plurality of storage units 1 having different positions in the horizontal direction of the rack is sometimes designated as the storage units 1 that are the transfer targets from which articles B are to be retrieved and transferred, as shown in FIG. 6. A plurality of storage units 1 having the same position in the horizontal direction of the rack and different positions in the vertical direction of the rack is also sometimes designated as the storage units 1 that are the transfer targets from which articles B are to be retrieved and transferred, as shown in FIG. 7.

Described below with reference to FIG. 6 is a case in which a plurality of storage units 1 having different positions in the horizontal direction of the rack is designated as the transfer target storage units 1.

Instructions issued by the ground controller 9 are such that the retrieval instruction for the first crane control device 26A ensures that the storage unit 1 from which the article B is to be retrieved is closer to the loading/unloading article support unit 3 in the horizontal direction of the rack than storage the unit designated by the retrieval instruction for the second crane control device 26B.

When the retrieval instruction is received by the first crane control device 26A, the first stacker crane 4a first retrieves the article B stored in the transfer target storage unit 1 as indicated by the dashed-line arrow in FIG. 6, and travel control by the travel control unit 26a, lift control by the lift control unit 26b, and transfer control by the transfer control unit 26c are then performed so that the first stacker crane 4a places the retrieved article B on the first receiving platform 13a.

When the retrieval instruction is received by the second crane control device 26B, the second stacker crane 4b first retrieves the article B stored in the transfer target storage unit 1 as indicated by the dashed-line arrow in FIG. 6, and travel control by the travel control unit 26a, lift control by the lift control unit 26b, and transfer control by the transfer control unit 26c are then performed so that the second stacker crane 4b places the retrieved article B on the second receiving platform 13b.

Described below with reference to FIG. 7 is a case in which a plurality of storage units 1 having the same position in the horizontal direction of the rack and different positions in the vertical direction of the rack is designated as the transfer target storage units 1.

The control means H is configured so as to execute the simultaneous transfer operation in the same manner as the simultaneous storage operation described above when articles B are transferred among a plurality of transfer target storage units 1 in the simultaneous retrieval operation.

Furthermore, the ground controller 9 issues a retrieval instruction for simultaneous transfer of articles to the second crane control device 26B so that the transfer target storage units 1 have the same position in the horizontal direction of the rack and a different position in the vertical direction of the rack, and issues a retrieval instruction for simultaneous transfer of the articles to the first crane control device 26A.

When the retrieval instruction for simultaneous transfer is received by the second crane control device 26B, the second stacker crane 4b first retrieves an article B stored in the corresponding transfer target storage unit 1 as indicated by the dashed-line arrow in FIG. 7, and travel control by the travel control unit 26a, lift control by the lift control unit 26b, and transfer control by the transfer control unit 26c are then performed so that the second stacker crane 4b transfers the retrieved article B to the second receiving platform 13b.

When the retrieval instruction for simultaneous transfer is received by the first crane control device 26A, the first stacker crane 4a first retrieves an article B stored in the corresponding transfer target storage unit 1. At this time, travel control by the travel control unit 26a and lift control by the lift control unit 26b are performed so that the transfer device 12 of the second stacker crane 4b and the transfer device 12 of the first stacker crane 4a overlap each other in the vertical direction.

The first crane control device 26A causes the transfer device 12 of the second stacker crane 4b and the transfer device 12 of the first stacker crane 4a to be superposed on each other in the vertical direction, whereupon travel control by the travel control unit 26a and lift control by the lift control unit 26b are performed so that the transfer device 12 of the first stacker crane 4a moves closer to the rack-side article transfer position at the storage unit 1 in which the article B is to be stored, and the transfer device 12 of the first stacker crane 4a is positioned within the non-interference range Q in which there is no interference in the vertical direction with the transfer device 12 of the second stacker crane 4b. When the transfer device 12 of the first stacker crane 4a is subsequently positioned in the rack-side article transfer position at the storage unit 1 in which the article B is to be stored, transfer control by the transfer control unit 26c is performed so that the first stacker crane 4a stores the received in the appropriate storage unit 1.

In the first crane control device 26A, travel control by the travel control unit 26a, lift control by the lift control unit 26b, and transfer control by the transfer control unit 26c are then performed so that the first stacker crane 4a places the retrieved article B on the first receiving platform 13a.

The first independent retrieval operation will next be described based on the dashed-line arrow and the like in FIG. 8. In the reverse of the first independent storage operation, the first independent retrieval operation retrieves an article by causing the article to be conveyed by the first stacker crane 4a.

The ground controller 9 issues a retrieval instruction to the first crane control device 26A, and issues a standby instruction or an ejection instruction to the second crane control device 26B.

In the first crane control device 26A, travel control by the travel control unit 26a, lift control by the lift control unit 26b, and transfer control by the transfer control unit 26c are performed so that the first stacker crane 4a first retrieves the article B stored in the storage unit 1, and then the first stacker crane 4a places the retrieved article B on the first receiving platform 13a, as indicated by the dashed-line arrow in FIG. 8.

When a standby instruction is received by the second crane control device 26B, the second stacker crane 4b is caused to stand by in position without travel control by the travel control unit 26a, lift control by the lift control unit 26b, or transfer control by the transfer control unit 26c being performed. When an ejection instruction is received by the second crane control device 26B, travel control by the travel control unit 26a is performed so that the traveling truck 10 is positioned in the prescribed travel target stopping position.

The second independent retrieval operation will next be described. In this operation, which is the reverse of the second independent storage operation, an article is retrieved by being conveyed using the second stacker crane 4b.

The ground controller 9 issues an ejection instruction for HP to the first crane control device 26A, and issues a retrieval instruction to the second crane control device 26B.

In the first crane control device 26A, travel control by the travel control unit 26a is performed so that the traveling truck 10 is positioned in the travel target stopping position for the loading/unloading-side article transfer position at the first receiving platform 13a.

In the second crane control device 26B, travel control by the travel control unit 26a, lift control by the lift control unit 26b, and transfer control by the transfer control unit 26c are performed so that the second stacker crane 4b first retrieves the article B stored in the storage unit 1, and then the second stacker crane 4b places the retrieved on the first receiving platform 13a, as indicated by the dashed-line arrow in FIG. 9.

Other Embodiments (1) In the embodiment described above, two stacker cranes 4 are brought into proximity with each other in the direction of horizontal movement, whereby the provided transfer devices 12 overlap each other in the vertical direction. It is, however, possible to appropriately modify the manner in which the transfer devices 12 of the two stacker cranes 4 are overlapped with each other in the vertical direction.

For example, the transfer devices 12 of the two stacker cranes 4 may be provided so as to be capable of moving not only vertically, but also horizontally along the direction of horizontal movement of the stacker cranes 4. A configuration may also be adopted in which the transfer devices 12 provided to the two stacker cranes 4 overlap each other in the vertical direction by being moved horizontally after the stacker cranes 4 are brought into proximity with each other in the direction of horizontal movement.

(2) In the embodiment described above, a travel rotary encoder 23 or a lift rotary encoder 22 is provided in order to detect the travel position of the traveling truck 10 on the travel path, or the vertical position of the lift platform 11 on the lift path. However, it is also possible to detect the travel position of the traveling truck 10 on the travel path or the vertical position of the lift platform 11 on the lift path by using a laser rangefinder, for example, and various types of sensors may be implemented.

(3) In the embodiment described above, an example was described in which two stacker cranes 4 are provided, but a configuration may also be adopted in which three or more stacker cranes 4 are provided.

(4) In the simultaneous transfer operation according to the embodiment described above, the second stacker crane 4b is moved horizontally, and the transfer device 12 is raised or lowered so that the transfer device 12 of the second stacker crane 4b is positioned in a rack-side article transfer position, and the first stacker crane 4a is also moved horizontally and the transfer device 12 is raised or lowered so that the transfer device 12 is positioned in a rack-side article transfer position, with the transfer device 12 of the first stacker crane 4a positioned within the non-interference range Q. However, it is possible to appropriately change which of the two stacker cranes 4 is moved horizontally while the transfer device 12 is kept within the non-interference range Q.

What is claimed is:

1. An article storage facility comprising:

an article storage rack having a plurality of storage units arranged in horizontal rows and vertical columns;

a single track extending in a vicinity of said article storage rack;

a plurality of article-conveying movable bodies configured to move horizontally on said track in order to convey an article between said article storage rack and a loading/unloading article support unit;

article transfer means, provided to each of said movable bodies and being capable of vertical movement, for transferring said article between the movable body and a storage unit or the article support unit; and control means for controlling the movements of said movable bodies;

wherein the dimensions of said movable bodies are determined such that when two of said movable bodies are positioned adjacent each other on said single track in the horizontal direction, the two article transfer means, provided to the two adjacent movable bodies, overlap in the vertical direction; and wherein one of the two article transfer means provided to the two adjacent movable bodies is overhead the other article transfer means.

2. The article storage facility according to claim 1, wherein:

said control means controls the horizontal movement of said movable bodies and the vertical movement of said article transfer means in order to cause said article transfer means to move to rack-side article transfer positions at each of said plurality of storage units, and to the loading/unloading-side article transfer position at said loading/unloading article support unit, and controls the transfer of the article transfer device so that said article transfer means transfers articles to and from said storage units at said rack-side article transfer positions, and to and from said loading/unloading article support unit at said loading/unloading-side article transfer position; and said control means positions said article transfer means provided to two of said movable bodies in the rack-side article transfer position at the storage unit that is the transfer target, and executes a simultaneous transfer operation for controlling the horizontal movement of said plurality of movable bodies, the vertical movement of said plurality of article transfer means, and the transfer of said plurality of article transfer means so that an article is transferred to the storage unit to which the article is to be transferred by said article transfer means when a plurality of articles is transferred, with the transfer targets comprising a plurality of storage units having the same position in the horizontal direction of the rack and different positions in the vertical direction of the rack among the plurality of storage units in said article storage rack.

3. The article storage facility according to claim 1, wherein each of said two movable bodies adjacent to each other in the direction of horizontal movement is provided with said article transfer means such that the article transfer means can be raised and lowered along a single vertical post vertically arranged at a position substantially spaced apart from a first end portion that is closer to an adjacent movable body in the direction of horizontal movement.

4. The article storage facility according to claim 2, wherein said control means causes a first moving body of said two movable bodies to move horizontally and said article transfer means to move vertically in order to position said article transfer means, which is provided to one of the two movable bodies that are adjacent to each other in the direction of horizontal movement, in the article transfer position on the side of said rack in said simultaneous transfer operation, and causes a second moving body of said movable bodies to move horizontally and said article transfer means to move vertically in order to position said article transfer means of the second moving body in the article transfer position on the side of said rack so as to cause said article transfer means provided to the second movable body to remain within an non-interference range in which there is no interference in the vertical direction with said article transfer means provided to the first movable body.

5. The article storage facility according to claim 3, wherein said article transfer means of each of said movable bodies has an opposing face that is closest to the vertical post provided to a movable body that is adjacent in the direction of horizontal movement; and the length (L1) by which said first end portion, of each of said movable bodies that is closer than the other end to each of said adjacent movable bodies, protrudes in the horizontal direction with respect to a reference surface of said vertical post is less than the length (L2) by which said opposing face protrudes in the horizontal direction from said reference surface of said vertical post.

6. The article storage facility according to claim 3, further comprising:
a guide rail spaced apart in the vertical direction from said track;
said vertical post of each of said movable bodies has an upper frame at the top portion thereof and guided by said guide rail; and
wherein the width of said upper frame in the horizontal direction is determined such that said upper frames of said two movable bodies do not come in contact with each other when said article transfer means of said two movable bodies overlap each other in the vertical direction.

7. The article storage facility according to claim 1, wherein each of the plurality of article-conveying movable bodies has a motor such that each of the plurality of article-conveying movable bodies is configured to move independently of one another.

8. An article storage facility comprising:
an article storage rack having a plurality of storage units arranged in horizontal rows and vertical columns;
a single track extending in the vicinity of said article storage rack;
a first vehicle and a second vehicle capable of moving horizontally on said track in order to convey an article between said article storage rack and a loading/unloading article support unit, wherein said first vehicle has a first front end and a first back end spaced apart from the first front end in a first direction parallel to said track, said first front end is closer to said second vehicle than said first back end, said second vehicle has a second front end and a second back end spaced apart from the second front end in said first direction, and said second front end is closer to said first vehicle than said second back end;

a single first vertical post disposed at a position substantially spaced apart from said first front end of said first vehicle;
a single second vertical post disposed at a position substantially spaced apart from said second front end of said second vehicle;
a first lift platform supported by, and capable of moving along, the first vertical post;
a second lift platform supported by, and capable of moving along, the second vertical post;
a first transfer device supported by said first lift platform and capable of transferring an article to and from said storage unit; and
a second transfer device supported by said second lift platform and capable of transferring an article to and from said storage unit; wherein
said first vehicle and second vehicle, and said first lift platform and second lift platform have dimensions such that when the first vehicle and the second vehicle are positioned adjacent each other in the horizontal direction, said first and second transfer devices are positioned in an overlapped state in the vertical direction so as to be able to transfer articles to storage units that belong to the same column simultaneously.

9. The article storage facility according to claim 8, wherein one of said first lift platform and first transfer device has a first opposing face closest to said second vertical post; one of said second lift platform and second transfer device has a second opposing face closest to said first vertical post; the length (L1) by which said first front end protrudes in the horizontal direction from a reference surface of said first vertical post is less than the length (L2) by which said first opposing face protrudes in the horizontal direction from said reference surface of said first vertical post; and the length by which said second front end protrudes in the horizontal direction from a reference surface of said second vertical post is less than the length by which said second opposing face protrudes in the horizontal direction from said reference surface of said second vertical post.

10. The article storage facility according to claim 8, further comprising: a guide rail spaced apart in the vertical direction from said track; wherein said first vertical post has a first upper frame at the top thereof guided by said guide rail; said second vertical post has a second upper frame at the top thereof guided by said guide rail; and the dimensions of said first and second upper frames in the horizontal direction are determined such that said first upper frame does not come in contact with said second upper frame when said first and second transfer devices overlap each other in the vertical direction.

11. The article storage facility according to claim 8, wherein one of the first and second article transfer devices is overhead the other of the first and second article transfer device such that horizontal positions of the first and second article transfer devices substantially coincide when two articles are transferred to two storage units belonging to the same column simultaneously by the first and second article transfer devices.

12. The article storage facility according to claim 8, wherein each of the first vehicle and second vehicle have a motor such that each of the first vehicle and second vehicle is configured to move independently of each other.

* * * * *